United States Patent
Grau et al.

(10) Patent No.: US 12,074,332 B2
(45) Date of Patent: Aug. 27, 2024

(54) METHOD AND DEVICE FOR CONNECTING COMPOSITE METAL FOILS FOR POUCH CELLS WITH A PRE-SEALING TAPE

(71) Applicant: VOLKSWAGEN AKTIENGESELLSCHAFT, Wolfsburg (DE)

(72) Inventors: Frederik Grau, Braunschweig (DE); Kartik Jamadar, Wolfsburg (DE); Christian Theuerkauf, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 521 days.

(21) Appl. No.: 17/150,413

(22) Filed: Jan. 15, 2021

(65) Prior Publication Data

US 2021/0226286 A1  Jul. 22, 2021

(30) Foreign Application Priority Data

Jan. 17, 2020  (DE) ............... 10 2020 101 087.7

(51) Int. Cl.
*H01M 50/186* (2021.01)
*H01M 50/105* (2021.01)
*H01M 50/119* (2021.01)
*H01M 50/124* (2021.01)

(52) U.S. Cl.
CPC ....... *H01M 50/186* (2021.01); *H01M 50/105* (2021.01); *H01M 50/119* (2021.01); *H01M 50/124* (2021.01); *H01M 2220/20* (2013.01)

(58) Field of Classification Search
CPC ............. H01M 50/186; H01M 50/124; H01M 50/105; H01M 50/119; H01M 2220/20
(Continued)

(56) References Cited

U.S. PATENT DOCUMENTS

| 2013/0266850 | A1 | 10/2013 | Hohenthanner |
| 2014/0356692 | A1* | 12/2014 | Park ................... H01M 50/121 429/185 |

(Continued)

FOREIGN PATENT DOCUMENTS

| CN | 108428814 | 8/2018 |
| DE | 10 2010 050 046 A1 | 5/2012 |

(Continued)

OTHER PUBLICATIONS

English machine-translation by Clarivate Analytics of DE-102010050046-A1, Hohenthanner, C., H01M10/0413, May 2012. Full DE patent application is included. (Year: 2012).*

(Continued)

*Primary Examiner* — S. Behrooz Ghorishi
*Assistant Examiner* — Gregory C. Grosso
(74) *Attorney, Agent, or Firm* — PEARL COHEN ZEDEK LATZER BARATZ LLP (57) ABSTRACT

A method for connecting a pre-sealing tape to a composite metal foil for pouch cells comprises at least the following steps: (a) creating a texture in at least a partial area of the composite metal foil; (b) applying a pre-sealing tape onto the composite metal foil, whereby the texture is at least partially covered by the pre-sealing tape; (c) connecting the pre-sealing tape to the composite metal foil to form a composite body; and (d) cutting the composite body to the predefined finished contour.

6 Claims, 4 Drawing Sheets

(58) Field of Classification Search
USPC .......................................................... 156/245
See application file for complete search history.

(56) References Cited

U.S. PATENT DOCUMENTS

2017/0137159 A1* 5/2017 Sullivan .................... B32B 3/28
2022/0131126 A1* 4/2022 Xiao .................... H01M 50/536

FOREIGN PATENT DOCUMENTS

| DE | 10 2013 021113 | 6/2015 |
| DE | 10 2017 217676 | 4/2019 |
| JP | 2004-006124 A | 1/2004 |
| JP | 2004052100 | 2/2004 |
| WO | WO 2014/112141 | 7/2014 |

OTHER PUBLICATIONS

English machine-translation by Clarivate Analytics of EP-3220467-A1, Kim, J., et al., H01M10/052, Sep. 2017. Full EP patent application is included. (Year: 2017).*

English machine-translation by Clarivate Analytics of JP-2004006124-A, Sekiguchi, T., et al., H01M2/02, Jan. 2004. Full JP patent application is included. (Year: 2004).*

English machine-translation by Clarivate Analytics of DE-102010050046-A1, Hohenthanner, C., H01M 10/0413, May 2012. Full DE patent application is included. (See the NPL filing on Aug. 1, 2023). (Year: 2012).*

English machine-translation by Clarivate Analytics of EP-3220467-A1, Kim, J., et al., H01M10/052, Sep. 2017. Full EP patent application is included. (See the NPL filing on Aug. 1, 2023). (Year: 2017).*

English machine-translation by Clarivate Analytics of JP-2004006124-A, Sekiguchi, T., et al., H01M2/02, Jan. 2004. Full JP patent application is included. (See the NPL filing on Aug. 1, 2023). (Year: 2004).*

Search report for German Patent Application No. 10 2020 101 087.7, dated Sep. 24, 2020.

Search Report for Chinese Patent Application No. CN 202110054156, dated Sep. 15, 2022.

Search Report for European Patent Application No. EP 21150636 dated May 26, 2021.

* cited by examiner

FIG. 1
Stand der Technik

METHOD AND DEVICE FOR CONNECTING COMPOSITE METAL FOILS FOR POUCH CELLS WITH A PRE-SEALING TAPE

CROSS REFERENCE TO RELATED APPLICATION

This application claims priority from German Patent Application No. 10 2020 101 087.7, filed Jan. 17, 2020, the entire contents of which is incorporated herein by reference.

FIELD OF THE INVENTION

The invention relates to a method and to a device for connecting a pre-sealing tape to a composite metal foil for pouch cells.

SUMMARY OF THE INVENTION

The state of the art discloses several types of batteries with pouch cells which, as a rule, are configured as galvanic cells. Such pouch cells, which are generally referred to as battery cells, are employed, for example, to supply electric energy for powering vehicles. Another application is to supply electric energy for operating mobile devices such as, for instance, mobile phones, tablets or laptops. Due to the ever-increasing requirements being made of such batteries and of the battery cells installed in them, there is an ongoing effort to lower the production costs, to prolong the service life of the batteries and to concurrently increase the power density, that is to say, the amount of stored electric energy per volume unit.

The pouch cells known from the state of the art fundamentally consist of an anode, a cathode and a separator arranged between them. The anode and the cathode form the electrodes of the pouch cells. The separator serves to prevent electric contact between the two electrodes. Moreover, the presence of an electrolyte that has to wet or pass through both electrodes is necessary for the proper functioning of the pouch cells. The electrodes themselves are generally made up of multiple electrode tracks which are likewise electrically isolated from each other by means of separators.

The current generated in the pouch cells is derived from the individual electrode tracks by means of so-called arrester lugs. For this purpose, the arrester lugs are electrically conductively connected to the individual electrode tracks and they conduct the current from there to an arrester tab to which they are likewise electrically conductively connected. The cited components are subsequently tightly wrapped in a composite metal foil, whereby the arrester tabs of each individual electrode protrude at least partially out of this sheathing and form the terminals of the battery. A so-called pre-sealing tape that ensures a tight seal between the arrester tab and the composite metal foil is provided in the area of the arrester tab in order to attain a reliable and permanently tight sealing of the composite metal foil.

When it comes to solutions known in actual practice, the pre-sealing tapes turn out to be problematic when the arrester is being welded. The arrester tabs are normally connected to the individual electrodes in that they are welded to the arrester lugs. As a rule, this leads to heat input into the arrester tab, as a result of which the temperature-sensitive pre-sealing tapes can be damaged. In order to prevent this, it is necessary to continuously and often very laboriously cool the arrester tabs and the pre-sealing tapes during the welding process. As an alternative, the distance between the weld and the pre-sealing tape is selected in such a way that no heat input affects the pre-sealing tape. In actual practice, however, the distance usually cannot be set to be so large since such a large distance results in a loss of valuable installation space. However, the pre-sealing tape must not be damaged or heated during manufacture since, in a later process step, it has to enter into an integrally bonded connection with the composite metal foil, the latter also being referred to as a pouch foil. In actual practice, the arrester tabs are regularly procured with the associated pre-sealing tapes in the form of prefabricated one-piece products.

In view of the above-mentioned limitations, only certain welding methods such as, for example, spot welding, resistance welding or linear welding (laser welding) can be employed at the present time for the manufacture of the arrester tabs. The use of surface welding (also known as pressure welding) is not possible since this would cause damage to the pre-sealing tapes.

Moreover, the solutions known up until now entail other drawbacks. For instance, the welding process needed to connect the arrester lugs of the electrodes to the arrester tab requires complicated and continuous cooling. In this process, it must be ensured that the pre-sealing tape is not damaged or heated so as to ensure an integrally bonded connection to the composite metal foil in the subsequent production process. Furthermore, there is the disadvantage that only certain welding methods can be used and thus the electric connection between the arrester lug and the arrester tab has a relatively high electric resistance. Moreover, during the production process, there has to be a transport securing device between the arrester tab and the pre-sealing tape in order to prevent the pre-sealing tape from being accidentally lost.

Before this backdrop, the objective of the present invention is to at least partially solve the problems stemming from the state of the art. In particular, a method is to be put forward for processing a composite metal foil for pouch cells that simplifies the production process and improves the electric properties of the pouch cells and thus of the entire battery.

SUMMARY OF THE INVENTION

A method having the features according to the independent claims contributes to achieving these objectives. Advantageous refinements are the subject matter of the dependent patent claims. The features listed individually in the patent claims can be combined with each other in a technically meaningful manner and can also be augmented with explanatory statements from the description and/or details from the figures, whereby additional embodiments of the invention are presented.

Below, a method for connecting a pre-sealing tape to a composite metal foil for pouch cells is being put forward, said method comprising at least the following steps:
 a) creating a texture in at least a partial area of the composite metal foil;
 b) applying a pre-sealing tape onto the composite metal foil, whereby the texture is at least partially covered by the pre-sealing tape;
 c) connecting the pre-sealing tape to the composite metal foil to form a composite body; and
 d) cutting the composite body to the predefined finished contour.

In step a), a texture is created in at least a partial area of the composite metal foil. The texture can be created as a regular or irregular elevation or indentation on the surface of the composite metal foil. The texture can be created in the form of a single elevation or indentation or else as a plurality of elevations or indentations. The texture can be configured, for example, in the form of a certain pattern. For instance, the texture can have elevations or indentations running in various directions. In this context, the indentations can also extend through the entire wall thickness of the composite metal foil, so that the composite metal foil is pierced at these sites. Textures can also be created by embossed sections such as, for example, punctiform elevations or indentations or else linear ribs or indentations. Textures can also especially be configured in the form of repeating patterns such as, for instance, intersecting lines. In this context, the textures are preferably embossed using a tool, particularly an insert.

According to step b), the pre-sealing tape is applied onto the composite metal foil, a process in which it at least partially covers the area of the composite metal foil that has been provided with the texture. In particular, step b) can be carried out after step a) has been completed. In step b), for example, the pre-sealing tape can be (automatically) placed onto the composite metal foil at a prescribed site.

Step c) serves to connect the pre-sealing tape to the composite metal foil to form a composite body and to subsequently cut it to the required and predefined contour. During the connecting process, the pre-sealing tape and the composite metal foil are affixed to each other, after which the connection is established with or without a joining agent, preferably at room temperature. In this process, pressure is preferably applied in the area of the texture in order to create adhesion and/or a positive fit between the composite metal foil and the pre-sealing tape.

The cutting to size according to step d) is done in a severing step, especially by means of a severing procedure in which the edge area of the composite metal foil is cut to size. In this context, it is especially possible to combine steps c) and d) into a combined method step.

In this manner, the process step of connecting the composite metal foil to the pre-sealing tape can be executed at the same time as the severing of the foil. The severing is necessary because of the irregular edges of the foil resulting from the shaping. Moreover, the severing produces the later target size of the pouch foil. Owing to the combined execution of the connection and the severing, the cost-effectiveness of the production process is considerably enhanced.

Consequently, the composite metal foil thus manufactured can be easily utilized in the production process of a pouch cell or of a battery consisting of several pouch cells. This is due to the fact that the pre-sealing tape is securely arranged on the composite metal foil and not on the arrester tab as had been the case up until now. This also entails several advantages. For one thing, this eliminates the heat sensitivity of the arrester tab, for instance, during the welding, and it also allows the use of other particularly advantageous welding methods such as pressure welding, as a result of which the ohmic resistance of the pouch cells can be reduced. The advantage of pressure welding lies in the fact that this technique makes it possible to create electric connections that have a considerably lower electric resistance. Therefore, the electrons that are to be conducted do not have to make their way from one component to the next via small transfer sites, but rather, they can make use of the entire contact surface between the components, thus significantly lowering the ohmic power loss and causing much less warming of the pouch cells during energy uptake or energy dissipation.

Another advantage of the arrangement of the pre-sealing tape on the composite metal foil lies in the fact that the arrester tabs no longer have to be continuously cooled during the welding process. This considerably simplifies the production process. Moreover, it is possible to dispense with the transport securing devices that had previously been necessary to position the pre-sealing tapes with the arrester tabs since the pre-sealing tape is now securely connected to the composite metal foil and can thus be easily introduced into the production process without the risk of being lost. Thus, for instance, up until now it had been necessary to secure the pre-sealing tape to the arrester tab using an adhesive or by means of welding. The solution being proposed here eliminates this work step and makes it possible to avoid the need for another material or another joining agent such as, for instance, an adhesive.

Finally, the arrester tabs now no longer need to be pre-fabricated together with the pre-sealing tape, as a result of which the acquisition costs can also be reduced.

In particular, it can be provided for the pre-sealing tape to be connected to the composite metal foil by means of adhesion and/or a positive fit brought about by the texture that had been previously created. For this purpose, the pre-sealing tape is pressed against the texture, so that a reliable connection is established between these two components. In this context, the term "adhesion" refers to the generation of adhesive forces between the pre-sealing tape and the composite metal foil. This can take place under pressure, for instance, by pressing the two components with or without texture. As an alternative, auxiliary materials can also be deployed which, like an adhesive, then effectuate the adhesion between the components.

An advantage of the present invention consists of the fact that the connection of the composite metal foil to the pre-sealing tape can be integrated into the two subsequent process steps, namely, deep drawing and severing. This entails the advantage of simplifying the production process.

In particular, it is also advantageous if, prior to the creation of the texture on the surface of the composite metal foil, the latter is inserted into a shaping device having a recess. For this purpose, the composite metal foil is placed, for example, onto a die, whereby the die has such a recess matching the shape that the finished composite metal foil or pouch foil is supposed to acquire later on. In this process, the composite metal foil can be firmly affixed in the die by means of a hold-down device in order to ensure that it is securely held during the processing. In this context, the hold-down device functions along the lines of a foil holder or blank holder for the pouch foil.

In particular, it is also advantageous for the texture on the composite metal foil to be created in step a) by means of an insert in the hold-down device in the shaping device. Towards this end, an insert that has been provided in the hold-down device or else a separately provided insert closes shortly before or at the end of the shaping process in order to create the envisaged texture in the composite metal foil. The texture can be created simultaneously during the severing procedure or else subsequently. For instance, the hold-down device—which is an integral part of the shaping device—can be used to affix the composite metal foil. This is done in that the composite metal foil is first placed onto the die. Subsequently, the hold-down device is moved in the direction of the die and it then presses the composite metal foil against the die.

In particular, it is also advantageous for the texture on the composite metal foil to be created in step a) by means of an insert in the hold-down device in the shaping device.

Towards this end, an insert that has been provided in the hold-down device or else a separately provided insert closes shortly before or at the end of the shaping process in order to create the envisaged texture in the composite metal foil. The texture can be created simultaneously during the severing procedure or else subsequently. For instance, the hold-down device—which is an integral part of the shaping device—can be used to affix the composite metal foil. This is done in that the composite metal foil is first placed onto the matrix. Subsequently, the hold-down device is moved in the direction of the matrix and it then presses the composite metal foil against the matrix.

It is particularly advantageous if the step of creating the texture is carried out prior to step a) or at least shortly before the end of the deep drawing process. In this context, the expression "shortly before the end" means that the shaping process is already more than 80%, preferably more than 90%, complete, and that no major changes are to be expected in the edge area of the composite metal foil. In this manner, the texture can be created onto the composite metal foil already at the end of the shaping procedure or shortly thereafter. The flow of material under the hold-down device during the deep drawing is not affected by the process. This can be achieved, for example, by means of simple inserts that are provided in the hold-down device and that act on the surface of the composite metal foil shortly before the end of the shaping procedure by means of separate gas springs in order to create the desired texture.

The shaping procedure, which can especially be configured as a deep drawing process involving a punch and a die, can be implemented employing various familiar methods and techniques which, for example, make use of a punch and a mating die.

In particular, the composite metal foil can be shaped inside a cavity in one method step. This method step can fundamentally take place before, during or after method steps a) to d). The execution of the shaping procedure can be carried out as a function of the type of deep drawing process that has been selected. For instance, the deep drawing procedure can be done, for example, by means of a punch, by means of electromagnetic pulse shaping and/or by means of compressed air. An advantage of the present invention is that the deep drawing procedure and steps a) to d) can be integrated into one method step without having to be repositioned.

It is especially advantageous if a composite aluminum foil is used as the composite metal foil. Such foils are readily available and have already proven their worth for sheathing pouch cells. As a rule, the foils consist of various plastic layers, whereby the base is an aluminum foil having a thickness of approximately 40 μm. Both sides of the aluminum foil are sheathed by several plastic layers that are needed for the shaping, for the insulation and for the subsequent integrally bonded connection. This yields foil thicknesses between approximately 120 μm and 180 μm [micrometers], which can vary depending on the manufacturer and on the specifications.

In particular, at least one composite metal foil of the type proposed here, a cell stack, an arrester tab and an arrester lug can all be used to carry out a method for the production of a pouch cell comprising the following steps:
 a) connecting the arrester tab to the arrester lug;
 b) joining the arrester tab to the cell stack;
 c) sheathing the cell stack and the arrester stack with at least one composite metal foil; and
 d) sealing the composite metal foil.

The placement of the pre-sealing tape onto the pouch foil and the resultant better possibilities for welding the arrester tabs and the arrester lugs of the cell stack facilitate the production of the pouch cells. This, in turn, also improves the manufacture of pouch cells to a considerable extent. Adhering to the described process sequence allows the production of a composite metal foil having a very precise edge contour. Moreover, the pre-sealing tapes can be positioned very precisely on the composite metal foil. This enhanced manufacturing precision has an advantageous effect on the subsequent manufacturing step for the production of the pouch cells. In this later step, the precisely manufactured composite metal foil ensures the precise positioning of the pouch foil, including the pre-sealing tape, relative to the arrester tab. Moreover, the additional process steps involving securing the pre-sealing tape for transport and positioning it relative to the arrester tab are no longer necessary.

The pouch cell configured according to this method can be produced in a very simple manner, without the need for additional cooling of the arresters during the connection to the arrester lugs. Moreover, the composite metal foils used to sheathe the cell stack can be sealed particularly easily and reliably in step C) since the pre-sealing tapes are already arranged securely on the composite metal foil. Extra transport securing devices aimed at affixing the pre-sealing tapes to the arrester tabs are no longer necessary. Consequently, the use of the composite metal foil being put forward here for the production of pouch cells considerably simplifies the manufacture of these cells.

Especially preferred embodiments of pouch cells provide for the use of two composite metal foils that have previously been given the requisite shape by means of a deep drawing procedure. The two composite metal foils then sheathe a cell stack. The current generated in this cell stack is then supplied to a consumer by means of a plurality of arrester lugs and via two arrester tabs. As a function of their polarity, the arrester lugs are electrically connected to one of the two arrester tabs, so that all of the arrester lugs connected to a cathode are linked to a first arrester tab, and all of the arrester lugs connected to an anode are linked to a second arrester tab.

For purposes of achieving the cited objective, a device for the production of composite metal foils for pouch cells, having a die, is also being put forward, said device being characterized in that the die is configured so as to mate with the pre-formed composite metal foil, said device having a feed device to feed pre-sealing tape to the die and a limit stop to position the pre-sealing tape on the die, also having a hold-down device that is configured to connect the pre-sealing tape to the composite metal foil, and a cutting tool to cut the composite metal foil. By means of a device configured in this manner, pre-formed composite metal foils that had been previously brought into a desired half-shell shape by means of a deep drawing procedure can be connected to the pre-sealing tape and precisely cut to size without the risk of being lost. In this process, the steps of feeding the pre-sealing tape, connecting the pre-sealing tape to the composite metal foil and cutting the latter to size can all be carried out at a production station. This markedly increases the manufacturing efficiency since no further transport is required between these steps. Preferably, the steps are carried out in an automated process. For this purpose, the loader can prepare a plurality of pre-sealing tapes that are conveyed to the die by means of a conveying device. Once there, the pre-sealing tapes come to rest against limit stops which are configured, for instance, as springloaded movable studs in the hold-down device, thus being precisely positioned over the composite metal foil. After the pre-sealing tape and the composite metal foil have been fed and positioned, they are connected. This can be done, for instance, by welding using the hold-down device. Towards this end, the hold-down device can exert the appropriate amount of contact pressure onto the composite body consisting of the pre-sealing tape and the composite metal foil and/or it can ensure that a sufficiently high temperature is introduced into the composite body. Finally, the composite body is then brought into the desired shape in that preferably the peripheral outer edge is cut to the proper size and shape employing the cutting tool.

In this context, the cutting tool is preferably integrated into the hold-down device. In this manner, the device can have a more compact design. Moreover, in this embodiment, the connecting step can be executed simultaneously with the cutting of the outer contour during the severing step.

In particular, the limit stop is advantageously integrated into the hold-down device. As a result, for example, the pre-sealing tape can be positioned while the hold-down device is open, and the connecting and cutting operations can be carried out simultaneously when the hold-down device is closed.

Finally, such pouch cells can be advantageously employed in motor vehicles since their production is cost-efficient and moreover, they exhibit improved electric properties due to the improved and reduced ohmic resistance. These properties are such that, during operation, for example, the pouch cells do not warm up, or else only considerably less, and they can also deliver a higher performance.

For the sake of clarity, it should be pointed out that the numerals used here ("first", "second", etc.) serve primarily (only) to differentiate among several similar objects, dimensions or processes, in other words, they especially do not necessarily indicate a dependence and/or sequence of these objects, dimensions or processes relative to each other. If such a dependence and/or sequence is necessary, this is explicitly mentioned here or else it is obvious to the person skilled in the art upon an examination of the concretely described embodiment.

BRIEF DESCRIPTION OF THE DRAWINGS

The invention as well as the technical field will be explained in greater detail below on the basis of the accompanying figures. It should be pointed out that the invention is not to be construed as being restricted to the embodiments presented. In particular, unless explicitly indicated otherwise, it is also possible to extract partial aspects of explanatory statements and to combine them with other components and insights stemming from the present description. It should be especially pointed out that the figures and particularly the size relationships are only of a schematic nature. The following is shown.

DETAILED DESCRIPTION OF THE INVENTION

Figure 1:
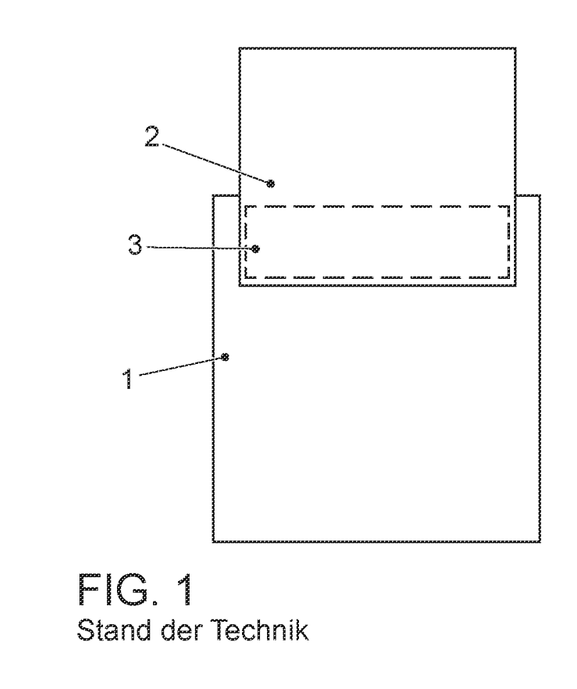
FIG. 1: an arrester tab with a composite metal foil and a pre-sealing tape according to the state of the art.

FIG. 1 shows an arrester tab 1 with a composite metal foil 2 (pouch) and a pre-sealing tape 3. The arrester tab 1 consists of an electrically conductive metal, for instance, aluminum, copper or steel and, in the finished, mounted state, it serves as a contact for a pouch cell 4 (not shown in this view). The composite metal foil 2 consists of a very thin metal layer that has been applied onto a carrier layer. The carrier layer can be made, for example, of a plastic such as polypropylene or polyethylene. According to the state of the art, in the finished, mounted state, the plastic side of the composite metal foil 2 has to be connected to the arrester tab 1, whereby the pre-sealing tape 3 is arranged between the two components in order to ensure a permanent, tight sealing of the pouch cells 4 towards the outside. This is necessary in order to prevent electrolyte from escaping or foreign matter from getting into the pouch cells 4. The arrester lugs that are likewise necessary for the proper functioning of the pouch cells 4 then still have to be connected to the arrester tab 1 in order to attain the functionality of the pouch cells 4. According to the state of the art, this is done by means of welding, a process in which the arrester tab 1 has to be continuously cooled since otherwise this could lead to heat input into the pre-sealing tape 3, damaging the latter. Consequently, the production of pouch cells according to the state of the art is very awkward and error prone.

Figure 2:
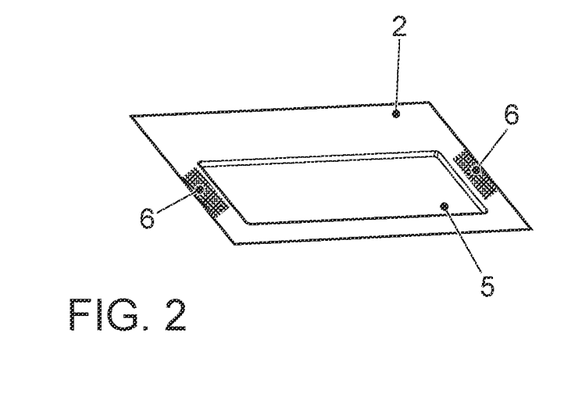
FIG. 2: a deep drawn composite metal foil having a texture.

FIG. 2 depicts a composite metal foil 2 in an oblique view. The composite metal foil 2 has already been through a deep drawing process and it has a cavity 5 to receive a cell stack (not shown here). To the right and left of the cavity 5, there are two areas 6 into which a texture has been created in the surface of the composite metal foil 2. The procedure of creating the texture will be explained in greater detail below.

Figure 3:
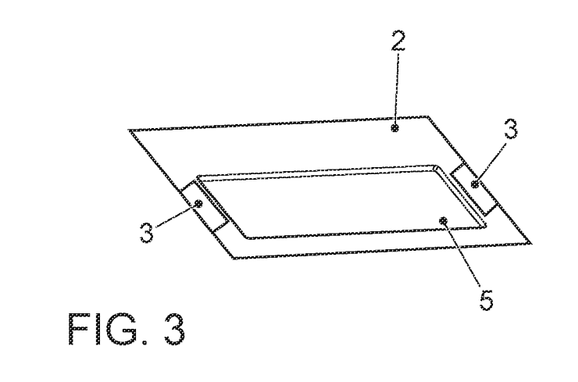
FIG. 3: a deep drawn composite metal foil having a texture and a pre-sealing tape.

FIG. 3 shows the composite metal foil 2 according to FIG. 2 in a subsequent processing state in which a pre-sealing tape 3 has been applied onto the texture 6 and connected to the composite metal foil 2 without the risk of being lost. The manufacturing procedure of this composite metal foil 2 will be explained in greater detail on the basis of FIGS. 4 and 5.

Figure 4:
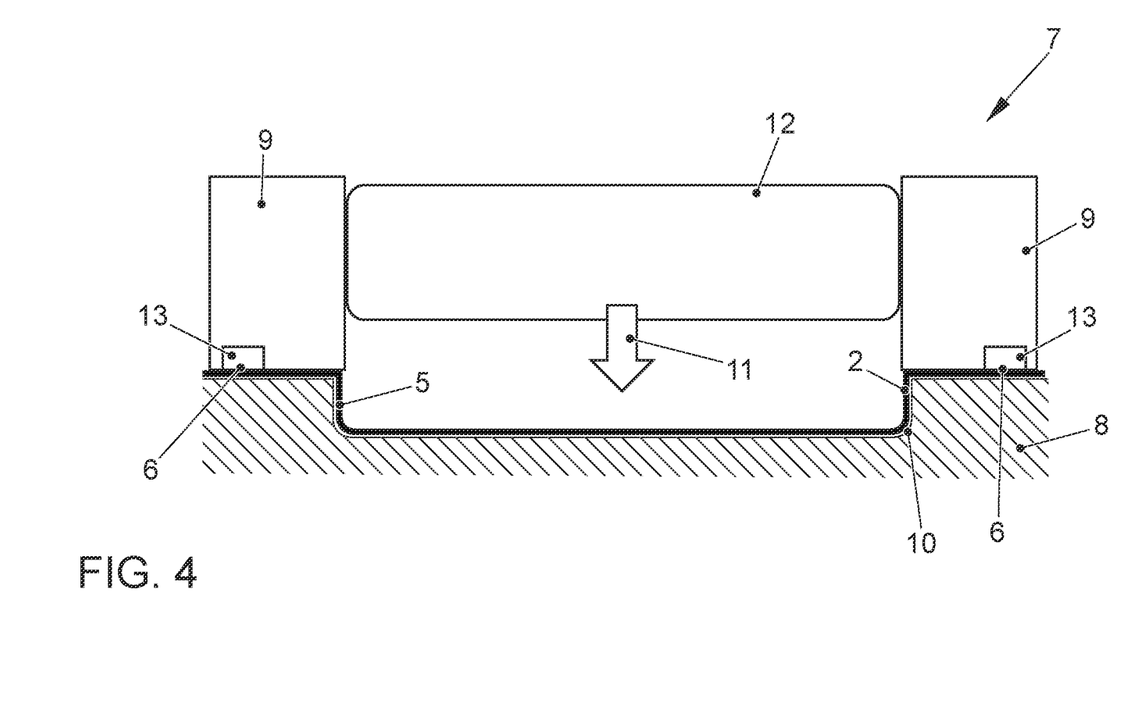
FIG. 4: a sectional side view of a shaping device according to the invention during the deep drawing.

FIG. 4 shows a possible embodiment of a shaping device 7 according to the invention for carrying out the method according to the invention. The shaping device 7 consists of a die 8 and a hold-down device 9. The die 8 has a recess 10 which is configured to mate with the cavity 5 which is to be formed in the composite metal foil 2 after the deep drawing procedure. The composite metal foil 2 is pressed against the die 8 by the hold-down device 9 in the direction of the arrow 11 and thus securely affixed in place. Once the composite metal foil 2 has been securely affixed in this manner, a punch 12 is moved downwards likewise in the direction of the arrow 11, so that the composite metal foil 2 undergoes shaping and forms the desired cavity 5 inside the recess 10. Shortly before the end of the deep drawing or shortly thereafter, a texture 6 is created in a partial area of the surface of the composite metal foil 2. This is done by means of inserts 13 which are placed on the underside of the hold-down device 9, that is to say, on the side facing the die 8, and which have a surface that matches the negative shape of the desired texture of the composite metal foil 2. The inserts 13 are moved and controlled by means of gas springs that generate a sufficient actuation force. With the shaping device 7 configured in this manner, the composite metal foil 2 can be deep drawn either in a single work step or else in two work steps that are directly consecutive or that make a transition into one another, and then the composite metal foil 2 is provided with a texture 6. Once both of these procedures have taken place, the composite metal foil 2 thus prepared can be conveyed as a pouch for further processing in order for a pouch cell to be produced.

Figure 5:
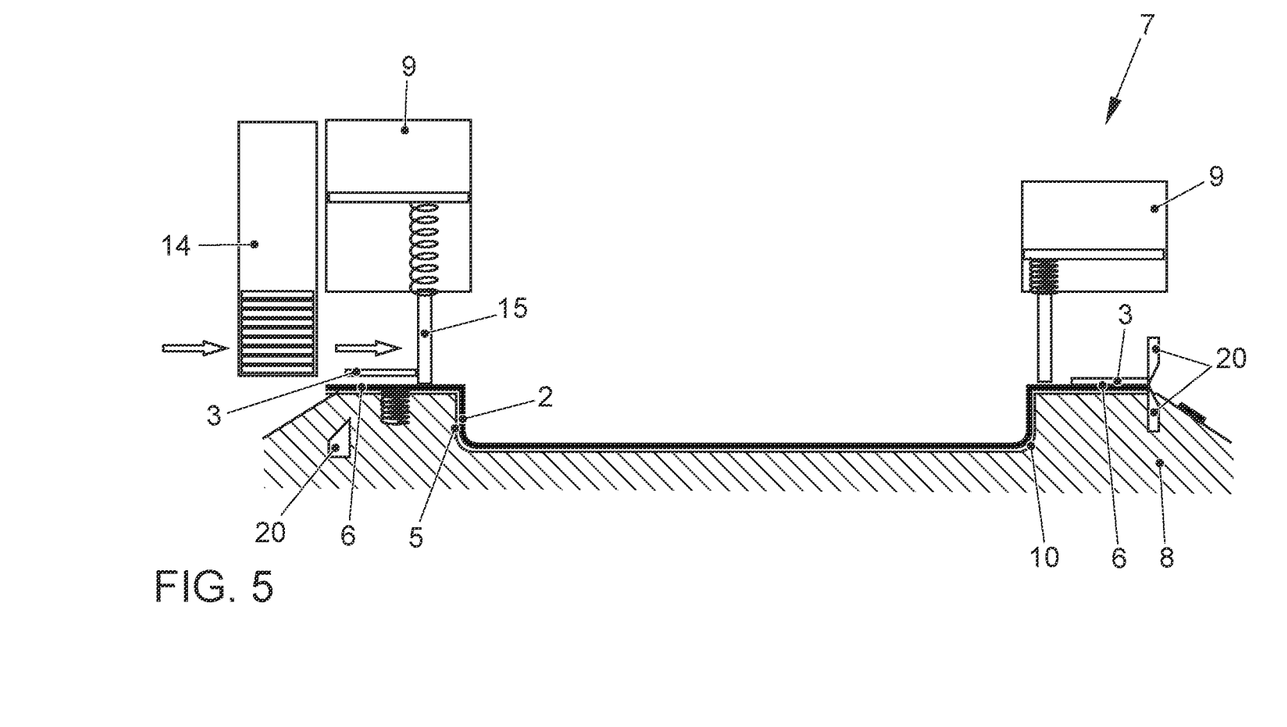
FIG. 5: a sectional side view of a shaping device according to the invention during the application of the pre-sealing tape.

FIG. 5 shows the shaping device 7 in a further processing state. In this context, the composite metal foil 2 is once again situated in the recess 10 of the die 8. The hold-down device 9 shown on the left-hand side is depicted in a raised position. A pre-sealing tape 3 is fed from a loader 14 in the direction of the arrow shown here and it then comes to rest against a limit stop means, here a limit stop 15. The limit stop 15 is integrated into the hold-down device 9 and moves into the latter as soon as the hold-down device 9 is moved downwards against the die 8. The limit stop 15 is configured in such a way that the pre-sealing tape 3 is arranged exactly over the texture 6. Subsequently, the hold-down device 9, as shown on the right-hand side in FIG. 5, is moved downwards, a process in which the pre-sealing tape 3 is firmly connected to the composite metal foil 2 via the previously created texture 6, for instance, by means of gluing, welding or pressing. In this manner, the pre-sealing tape 3 is connected to the composite metal foil 2 in such a way that it can be transported securely.

At the same time as the hold-down device 9 is lowered, or else in a subsequent separate work step, the composite metal foil 2 is cut precisely to the desired contour by means of a cutting tool 20. Various configurations are available when it comes to the design of the cutting tool 20. For instance, a very simple design involving just one cutting blade is shown on the left-hand side of the figure. In order to cut the contour to size, this cutting blade is simply moved upwards, a process in which it comes to rest against the hold-down device 9 that functions as a cutting jaw, thereby cutting the composite metal foil 2 to size. The right-hand side of the figure shows another possible embodiment in which two components form the cutting tool 20. One of the components is integrated into the hold-down device 9, while the second component is arranged in the die 8. The two components are positioned in such a way that, when the hold-down device 9 is lowered, they shear off the outer edge of the composite metal foil, thus ensuring that the contour of the composite metal foil 2 is true to size. Here, too, the right-hand side of the hold-down device 9 functions as a cutting jaw when it is lowered.

Subsequently, the composite metal foil 2 or pouch cell manufactured in this manner can be removed together with the pre-sealing tape 3 and further processed. Then, in order to produce a pouch cell, two such processed composite metal foils 2 can be employed in order to arrange a cell stack, including the associated arrester lug and arrester tab 1, in the pouch cell. In this context, the arrester tabs are arranged in such a way that they protrude in the form of contacts from this arrangement. Finally, the pouch cells thus created then only need to be sealed in that the edges of the composite metal foil 2 are joined together, a process in which the pre-sealing tape 3 permanently and tightly seals off the pouch cells 4, particularly at the outlet sites of the arrester tab 1.

Figure 6:
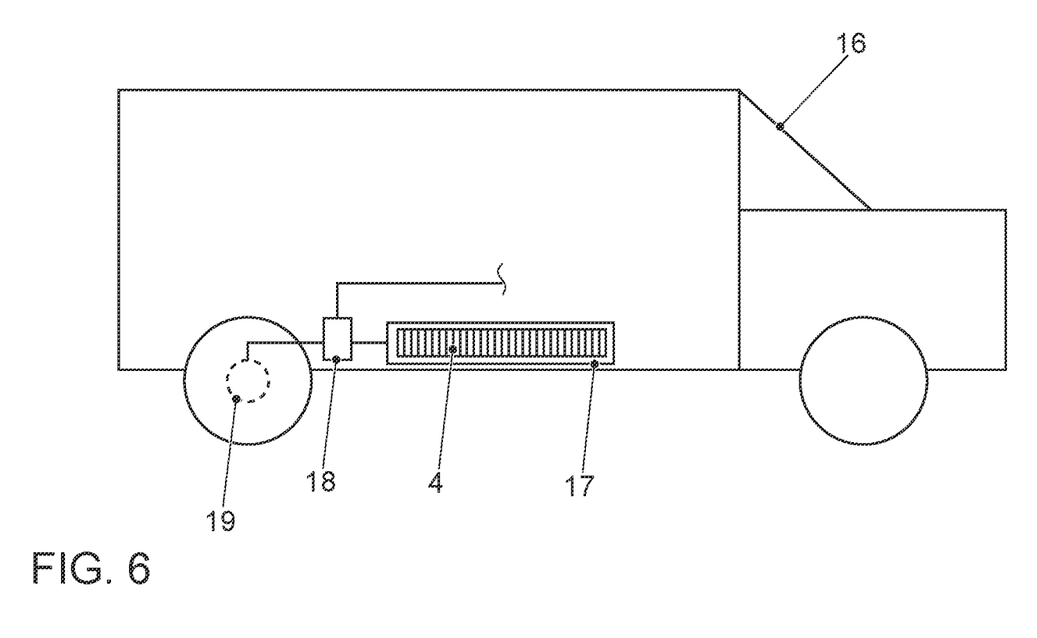
FIG. 6: a motor vehicle with pouch cells according to the present invention.

Finally, FIG. 6 depicts a motor vehicle 16 which is equipped with a battery 17 in which a plurality of pouch cells 4 have been arranged. The pouch cells 4 here are produced by means of the method according to the invention. Such a battery 17 can be produced cost efficiently and also exhibits extraordinarily low heat generation during operation since the ohmic resistance inside the pouch cells 4 is markedly reduced. The reduction of the ohmic resistance is made possible by using surface-based pressure welding (diffusion welding), something which was previously not possible because of the interfering contour, namely, the "pre-sealing tape". In the case of a vehicle equipped in this manner, the energy thus provided by the battery 17 can then be supplied as needed to an electric motor 19 by means of a control unit 18 in order to generate the driving power.

LIST OF REFERENCE NUMERALS 1 arrester tab
2 composite metal foil
3 pre-sealing tape
4 pouch cell
5 cavity
6 texture
7 shaping device
8 die
9 hold-down device
10 recess
11 arrow
12 punch
13 insert
14 loader
15 limit stop
16 motor vehicle
17 battery
18 control unit
19 electric motor
20 cutting tool

The invention claimed is:

1. A method for connecting a pre-sealing tape to a composite metal foil for pouch cells, comprising at least the following steps:
   a) creating a texture in at least a partial area of the composite metal foil;
   b) applying a pre-sealing tape onto the composite metal foil, whereby the texture is at least partially covered by the pre-sealing tape;
   c) connecting the pre-sealing tape to the composite metal foil to form a composite body; and
   d) cutting the composite body to the predefined finished contour,
   whereby, prior to step a), the composite metal foil is inserted into a shaping device having a recess, and
   whereby the texture on the composite metal foil is created in step a) by means of an insert in a hold-down device in the shaping device.

2. The method according to claim 1, whereby the pre-sealing tape is connected to the composite metal foil by means of adhesion brought about by the texture that has been previously created.

3. The method according to claim 1, whereby, prior to step a), the composite metal foil is shaped by means of deep-drawing.

4. The method according to claim 3, whereby the composite metal foil is shaped in a method step while it is inside the recess.

5. The method according to claim 1, whereby a composite aluminum foil is used as the composite metal foil.

6. The method according to claim 1, whereby a foil thickness between approximately 120 μm and 180 μm is selected for the composite metal foil.

* * * * *